United States Patent [19]

Farha, Jr. et al.

[11] 3,894,055

[45] July 8, 1975

[54] CATALYTIC OXIDATIVE DEHYDROGENATION OF ALKENES OR ALKADIENES TO FURAN COMPOUNDS

[75] Inventors: Floyd E. Farha, Jr.; Marvin M. Johnson; Donald C. Tabler, all of Bartlesville, Okla.

[73] Assignee: Phillips Petroleum Company, Bartlesville, Okla.

[22] Filed: July 19, 1973

[21] Appl. No.: 380,723

[52] U.S. Cl. ........ 260/346.1 R; 260/680 E; 252/470
[51] Int. Cl. ............................................. C07d 5/14
[58] Field of Search .................. 260/346.1 R, 680 E

[56] References Cited
OTHER PUBLICATIONS

Ai, Kogyo Kagaku Zasshi 1971, 74(2), p. 183–6, Chemical Abstracts 1971, Vol. 74, 125302.

*Primary Examiner*—Henry R. Jiles
*Assistant Examiner*—Bernard Dentz

[57] ABSTRACT

Alkenes and/or alkadienes are contacted with molecular oxygen and an oxidative dehydrogenation catalyst consisting essentially of molybdenum, vanadium, oxygen, and at least one promoter selected from the group consisting of iron, cobalt, and nickel, to produce furan compounds.

16 Claims, No Drawings

CATALYTIC OXIDATIVE DEHYDROGENATION OF ALKENES OR ALKADIENES TO FURAN COMPOUNDS

This invention relates to oxidative dehydrogenation catalysts and the use thereof for the conversion of alkenes and/or alkadienes to furan compounds.

Furan compounds can react readily with oxygen under oxidation conditions to produce ring cleavage and the formation of polymers. Accordingly, the production of furan compounds by the oxidative dehydrogenation of hydrocarbons has generally been avoided. Recently it has been discovered that furan compounds can be produced by the oxidative dehydrogenation of hydrocarbons in the presence of certain specific catalysts without substantial conversion of the furan compounds to undesirable products. The search for additional catalysts suitable for this reaction continues.

Accordingly, it is an object of the present invention to provide a new and improved oxidative dehydrogenation catalyst. Another object of the invention is to provide a new and improved process for the conversion of alkenes or alkadienes to furan compounds. Other objects, aspects and advantages of the invention will be apparent from a study of the specification and the appended claims to the invention.

In accordance with the present invention there is provided an improved catalyst for the production of furan type compounds from alkenes and alkadienes having from 4 to 10 carbon atoms, which catalyst consists essentially of molybdenum, vanadium, oxygen and at least one promoter selected from the group consisting of iron, cobalt, and nickel.

If desired, these catalysts can be supported on conventional solid catalytic support materials, for example zinc oxide, silica, alumina, boria, magnesia, titania, zirconia, and mixtures thereof. Where a catalyst support is employed, the support will generally constitute from about 10 to about 98, preferably from about 75 to about 95, weight percent of the total catalyst composition. Supports having surface areas in the range of about 2 to about 50 m²/g, preferably in the range of about 5 to about 20 m²/g, are desirable. The atom ratio of molybdenum to vanadium will generally be in the range of about 10:1 to about 0.5:1, and preferably will be in the range of about 5:1 to about 1:1. The atom ratio of promoter to vanadium will generally be in the range of about 2:1 to about 0.1:1, and preferably will be in the range of about 1:1 to about 0.3:1.

The catalysts of the present invention can be prepared by many suitable techniques, for example coprecipitation, impregnation, ion exchange aqueous or nonaqueous solution or suspension mixing, or dry mixing. In general, any method can be employed which will provide a composition containing the desired elements in the defined proportions, and which has a catalytic surface area of at least about 0.05 to about 20 m²/g and preferably about 0.1 to about 5 m²/g. Thus the catalyst components and/or compounds thereof can be combined in any suitable manner. Any compound of vanadium, molybdenum, or the promoter can be employed in the preparation of the catalyst so long as none of the compounds are detrimental to the final oxidative dehydrogenation catalyst and essentially all of the elements in the compounds employed, other than the vanadium, molybdenum, promoter metal and oxygen, are removed from the final catalyst by washing or by volatilization. However, small or trace amounts of some other elements which can be involved in the preparation of the catalyst can be tolerated in the final catalytic composition. For example, if alkali metal or alkaline earth metal hydroxides are employed in the preparation of the catalyst, very small residual amounts of such alkali metal and alkaline earth metals are not detrimental. Similarly, if nickel sulfate, cobalt sulfate or iron sulfate is employed in the preparation of the catalyst, small residual amounts of sulfur can be tolerated.

Generally, however, the preferred vanadium, iron, cobalt, nickel and molybdenum compounds are the oxides of these elements or compounds which are converted to the oxide on calcination. Thus, suitable compounds include the oxides, nitrates, halides, sulfates, oxalates, acetates, carbonates, propionates, tartrates, hydroxides, ammonium salts and the like, and mixtures thereof. Examples of these compounds include cobalt nitrate, cobalt acetate, cobalt hydroxide, cobalt oxide, cobalt propionate, iron oxide, iron nitrate, molybdenum oxide, ammonium molybdate, nickel oxide, nickel chloride, nickel nitrate, nickel carbonate, vanadium oxide, vanadium sulfate, ammonium vanadate, and the like, and mixtures thereof.

One technique for forming an unsupported catalyst of the present invention comprises mixing one or more molybdenum compounds, one or more vanadium compounds, and one or more promoter metal compounds. The compounds can be admixed in the form of dry compounds and then calcined, or the compounds can be admixed in the presence of a diluent to form a paste, which may be dried, if desired, before calcining. A particle forming step such as pelletizing or screening can precede the drying step or the calcining step.

A technique for forming a supported catalyst of the present invention comprises sequentially impregnating the support with solutions or dispersions of each component compound, drying and calcining the impregnated support.

The calcining step will be accomplished under conditions which ensure the conversion of any nonoxide compounds to the oxide form and the volatilizing of any undesired elements. In general the calcining step comprises heating the catalyst composition to a temperature in the range of about 800° F to about 1500° F for a time in the range of about 1 to about 40 hours. Presently preferred calcining conditions comprise a temperature in the range of about 850° F to about 1400° F for a time in the range of about 2 to about 24 hours in the presence of a molecular oxygen containing gas, for example, air.

Suitable feeds for conversion to furan compounds include the unsaturated acyclic hydrocarbons, particularly the acyclic alkenes and acyclic alkadienes having from 4 to 10 carbon atoms. Examples include n-butene-1, butene-2, n-pentene-1, isopentene, hexene-1, heptene-2, octene-1, decene-1, 2-methylbutene-1, hexene-3, 2-ethylbutene-1, 2-methylpentene-3, 3-ethylhexene-2, butadiene-1,3, pentadiene-1,3, isoprene, hexadiene-1,3, decadiene-1,3, and the like, and mixtures thereof. Acyclic alkadienes having from 4 to 5 carbon atoms are presently preferred.

The furan compounds produced by the process of the present invention have the formula

wherein each R is individually selected from the group consisting of hydrogen and alkyl radicals having from 1 to 6 carbon atoms, the total carbon atoms in the R radicals being in the range of 0 to 6. Representative products include furan, 2-methylfuran, 3-methylfuran, 2,5-diethylfuran, 2-n-hexylfuran, 2-isopropyl-3-methylfuran, 3-n-propylfuran, 3-methyl-4-n-butylfuran and the like.

In accordance with the present invention a hydrocarbon feed comprising one or more acyclic alkenes and/or one or more acyclic alkadienes is contacted, under suitable reaction conditions for conversion to furan compounds, with a molecular oxygen containing gas in the presence of the hereinabove defined catalyst. The molecular oxygen containing gas can be high purity oxygen, oxygen diluted with an inert diluent such as nitrogen, flue gas containing residual oxygen, air, or any other source of molecular oxygen which is at least essentially free of contaminants which would be detrimental to the desired reaction. In a presently preferred embodiment the oxidative dehydrogenation process is carried out in the absence of any halogen. In general, the temperature will be in the range of about 500° F. to about 1200° F., and preferably will be in the range of about 700° F to about 1100° F. Any suitable pressure can be employed, but in general the pressure will be in the range of about 0.05 to about 250 psia, and preferably will be in the range of about 0.1 to about 25 psig. The hydrocarbon feed rate will generally be in the range of about 10 to about 1000 standard cubic feet of alkenes and/or alkadienes per hour per cubic foot of catalyst bed (GHSV), and preferably will be in the range of about 100 to about 500 GHSV. The mol ratio of molecular oxygen to alkenes and alkadienes will generally be in the range of about 0.1:1 to about 3:1, and preferably will be in the range of about 0.5:1 to about 2:1. Steam can be employed in the reaction zone as a diluent and heat transfer agent. When steam is utilized, the mol ratio of steam to alkenes and alkadienes will generally be in the range of about 0.1:1 to about 50:1, and preferably will be in the range of about 5:1 to about 30:1.

The alkenes, if present, are largely converted to the corresponding alkadienes. The alkadienes, in turn, are converted in significant quantities to the corresponding furan compounds. However, the reaction effluent can also contain unreacted feed material, alkenes including ethylene, propylene and butenes, water, oxides of carbon, alkenylcycloolefins, crotonaldehyde, acetaldehyde and other oxygenated products. The furan compounds can be recovered by suitable techniques, for example by condensation from the reactor gas effluent followed by distillation. Unconverted alkenes and/or alkadienes can be recovered and recycled to the reactor, as can other materials such as crotonaldehyde which are convertible to furan compounds under the reaction conditions. If desired, the conversion of alkenes to furan compounds can be conducted in two reaction zones in series. The first reaction zone can be operated under conditions favorable for the conversion of the alkenes to alkadienes, while the second reaction zone can be operated under conditions favorable to the conversion of the alkadienes to furan compounds. The effluent from the first reaction zone can be subjected to conventional separation techniques to recover unconverted alkenes for recycle to the first reaction zone and a concentrated alkadiene stream for feed to the second reaction zone. If desired, the total effluent from the first reaction zone can be passed directly to second reaction zone without separation step. The effluent of the second reaction zone can be processed for recovery and recycle of unreacted alkadienes to the second reaction zone and for recovery of a furan compound product. The catalyst of the present invention can be employed in both reaction zones, or another suitable dehydrogenation catalyst can be employed in the first reaction zone while the present catalyst is utilized in the second reaction zone.

The following example is presented in further illustration of the invention and should not be construed in undue limitation thereof.

EXAMPLE

In each of a series of runs employing various catalysts, butadiene (400 GHSV) was contacted with molecular oxygen (400 GHSV) and steam (8000 GHSV) in the presence of about 2 cc of the respective catalyst. The reaction conditions and results are shown in the following table:

TABLE

| Runs | Atom Ratios Molybdenum to Vanadium | Promoter to Vanadium | Promoter | Temp. °F | Conversion of Butadiene % | Furan Yield % | Selectivity to Furan % | Acetaldehyde Yield % | Selectivity to Furan and Acetaldehyde % |
|---|---|---|---|---|---|---|---|---|---|
| 1  | 2/1   | 0.47/1 | Cobalt | 700  | 3.3  | 1.6  | 48.5 | NT(c) | 48.5 |
| 2  | 2/1   | 0.47/1 | Cobalt | 800  | 16.5 | 9.1  | 55.0 | NT    | 55.0 |
| 3  | 2/1   | 0.47/1 | Cobalt | 900  | 22.5 | 9.5  | 48.2 | NT    | 48.2 |
| 4  | 2/1   | 0.47/1 | Cobalt | 1000 | 23.6 | 8.2  | 34.8 | NT    | 34.8 |
| 5  | 2/1   | 0.47/1 | Cobalt | 800  | 8.5  | 6.4  | 75.4 | NT    | 75.4 |
| 6  | 2/1   | 0.47/1 | Cobalt | 900  | 17.8 | 10.5 | 59.0 | NT    | 59.0 |
| 7  | 2/1   | 0.47/1 | Cobalt | 1000 | 22.3 | 8.8  | 39.4 | NT    | 39.4 |
| 8  | 4/1   | 0.94/1 | Cobalt | 800  | 6.2  | 4.4  | 71.0 | NT    | 71.0 |
| 9  | 4/1   | 0.94/1 | Cobalt | 900  | 17.8 | 10.5 | 59.0 | NT    | 59.0 |
| 10 | 4/1   | 0.94/1 | Cobalt | 1000 | 23.0 | 10.4 | 45.1 | NT    | 45.1 |
| 11 | 4/1   | 0.47/1 | Cobalt | 700  | 3.6  | 1.4  | 38.8 | 0     | 38.8 |
| 12 | 4/1   | 0.47/1 | Cobalt | 800  | 19.4 | 8.9  | 45.8 | 0.47.7 | |
| 13 | 4/1   | 0.47/1 | Cobalt | 900  | 21.2 | 9.2  | 43.4 | 0.7   | 46.7 |
| 14 | 4/1   | 0.47/1 | Cobalt | 1000 | 20.8 | 8.6  | 41.3 | 1.0   | 46.4 |
| 15 | 4.2/1 | 0.47/1 | Cobalt | 1000 | 21.5 | 8.3  | 38.6 | 1.1   | 43.5 |
| 16 | 4.1/1 | 0.49/1 | Cobalt | 1000 | 22.3 | 9.4  | 42.1 | 1.2   | 47.5 |
| 17 | 2/1   | 0.47/1 | Cobalt | 800  | 4.8  | 3.7  | 75.6 | 0     | 75.6 |
| 18 | 2/1   | 0.47/1 | Cobalt | 900  | 14.3 | 10.2 | 71.3 | 0.5   | 74.9 |
| 19 | 2/1   | 0.47/1 | Cobalt | 1000 | 19.2 | 9.5  | 49.4 | 0.7   | 54.4 |

TABLE -Continued

| Runs | Atom Ratios Molybdenum to Vanadium | Promoter to Vanadium | Promoter | Temp. °F | Conversion of Butadiene % | Furan Yield % | Selectivity to Furan % | Acetaldehyde Yield % | Selectivity to Furan and Acetaldehyde % |
|---|---|---|---|---|---|---|---|---|---|
| 20 | 2/1 | 0.46/1 | Iron | 800 | 11.2 | 7.4 | 66.0 | 0.3 | 69.1 |
| 21 | 2/1 | 0.46/1 | Iron | 900 | 26.0 | 11.8 | 45.4 | 1.2 | 49.9 |
| 22 | 2/1 | 0.46/1 | Iron | 1000 | 20.6 | 8.3 | 40.5 | 0.7 | 43.8 |
| 23 | 4/1 | 0.92/1 | Iron | 1000 | 21.8 | 8.3 | 38.1 | 1.0 | 42.5 |
| 24 | 4/1 | 0.46/1 | Iron | 800 | 18.7 | 11.3 | 60.3 | 0.6 | 63.5 |
| 25 | 4/1 | 0.46/1 | Iron | 900 | 20.8 | 10.6 | 50.9 | 0.8 | 54.7 |
| 26 | 4/1 | 0.46/1 | Iron | 1000 | 20.7 | 8.2 | 39.6 | 0.8 | 43.8 |
| 27 | 4/1 | 0.94/1 | Cobalt | 900 | 30.6 | 11.6 | 37.9 | 0.3 | 38.8 |
| 28 | 4/1 | 0.46/1 | Iron | 900 | 32.6 | 11.6 | 35.6 | 0.3 | 37.0 |
| 29 | 4/1 | 0.40/1 | Nickel | 900 | 31.2 | 11.7 | 37.5 | 0.4 | 38.7 |
| 30 | 2/1 | 0.4/1 | Cobalt | 1000 | 27.2 | 2.6 | 9.5 | NT | 9.5 |
| 31 | 2/1 | 1/1 | Cobalt | 800 | 8.5 | 2.2 | 25.9 | NT | 25.9 |
| 32 | NA(A) | NA | None | (B) | 0 | 0 | 0 | 0 | 0 |
| 33 | NA | NA | Cobalt | 800 | 4.5 | 2.7 | 60.0 | 0 | 60.0 |
| 34 | NA | NA | Cobalt | 900 | 3.9 | 2.4 | 61.5 | 0 | 61.5 |
| 35 | 2/1 | NA | None | 800 | 12.9 | 9.3 | 72.1 | 0 | 72.1 |
| 36 | 2/1 | NA | None | 900 | 11.6 | 8.6 | 74.1 | 0.3 | 76.7 |
| 37 | 2/1 | NA | None | 1000 | 20.1 | 8.0 | 39.8 | 0.8 | 43.7 |
| 38 | NA | NA | Cobalt | 1000 | 1.2 | 0.5 | 41.7 | 0 | 41.7 |
| 39 | 4/1 | NA | None | 800 | 5.5 | 4.0 | 72.7 | 0 | 72.7 |
| 40 | 4/1 | NA | None | 900 | 7.5 | 5.9 | 78.6 | 0 | 78.6 |
| 41 | 4/1 | NA | None | 1000 | 20.0 | 10.8 | 54.0 | 0.6 | 57.0 |

(A)NA means not applicable
(B)No activity at 700–1000°F
(C)Not tested

The catalysts were generally prepared in small lots of about 20 grams or less using an amount of each component required to give the atom ratios shown in the table.

The catalysts of runs 1–14, 17–19 were made by mixing together an aqueous solution or dispersion consisting of ammonium molybdate, ammonium vanadate, cobalt acetate and water, evaporating the mixture to dryness and calcining the product. The catalyst of runs 1–14 was calcined at 900° F for 16 hours. The catalysts of runs 5–15 and 17–19 were calcined at 1000° F for 2 hours.

The catalyst of run 15 was made by dry mixing together ammonium molybdate, ammonium vanadate and cobalt acetate, pelleting the mixture and calcining the pellets at 1000° F for 5 hours. The catalyst of run 16 was made by mixing together vanadium trioxide, molybdenum trioxide and tricobalt tetroxide (i.e., $Co_3O_4$), pelleting the mixture and calcining the pellets at 1000° F for 5 hours.

The catalysts of runs 20–26 were made by mixing together an aqueous solution or dispersion consisting of ammonium molybdate, ammonium vanadate, ferric nitrate and water, evaporating the mixtures to dryness and calcining the products at 1000° F. for 2 hours.

The catalysts of runs 27–29 were made by mixing together an aqueous solution or dispersion consisting of water, ammonium molybdate, ammonium vanadate, and one of cobalt acetate (for run 27), ferric nitrate (for run 28) and nickel acetate (for run 29). To the mixtures was added sufficient ammonium hydroxide to give an alkaline reaction after which the mixtures were evaporated to dryness and the products calcined at 1000° F for 2 hours.

The catalysts of runs 30 and 31 are supported catalysts, the support being ZnO in each instance. The catalyst/support weight ratio was 18.5/81.5 in run 30 and 20.3/79.7 in run 31. The catalyst composition of run 30 was made by impregnating the support with aqueous solutions of ammonium molybdate, ammonium vanadate and cobaltous nitrate and evaporating to dryness. The catalyst composition of run 31 was made in a similar fashion except that the cobalt salt used was cobaltous acetate. The dried composites were calcined at 900° F for 16 hours.

The catalysts of runs 32–41 were controls. All of them were calcined at 1000° F for 2 hours after preparation. The catalyst of run 32 was made by evaporating an aqueous solution of ammonium molybdate to dryness. The catalyst of runs 33 and 34 was made by mixing together aqueous solutions of ammonium molybdate and cobaltous acetate and evaporating the mixture to dryness. The catalyst of runs 35–37 was made by mixing together a heated solution or dispersion consisting of ammonium molybdate, ammonium vanadate and water and evaporating the mixture to dryness. The catalyst of run 38 was made in a similar fashion to the catalyst of runs 33 and 34 except ½ the quantity of the cobalt salt was used. The catalyst of runs 39–41 was made in a similar fashion to the catalyst of runs 35–37 except ½ the quantity of ammonium vanadate was used.

The catalysts were normally tested at reactor temperatures of 700°, 800°, 900° and 1000° F in sequence. Data are reported only for those runs in which significant amounts of furan were produced.

The gaseous effluents, on a dry basis, were analyzed by means of gas-liquid chromatography. Products found included unreacted butadiene, furan, acetaldehyde, carbon oxides, ethylene, propylene and butenes. The reported selectivities to furan and furan plus acetaldehyde are modified selectivities based on the above gaseous product analyses. The yields of furan and acetaldehyde are expressed in terms of moles per 100 moles of butadiene feedstock.

Inspection of the Table reveals that molybdenum trioxide (run 32) and a binary mixture of molybdenum trioxide and cobalt oxide (runs 33, 34 and 38) at Mo/Co ratios of 1/1 and 2/1 are ineffective in converting butadiene into furan. However, catalysts containing molybdenum and vanadium in atom ratios of 2/1 and 4/1 (runs 35–37 and 39–41) are effective at reactor temperature of 800° to 1000° F in converting butadiene to furan. Based on selectivity, the best temperature in these runs was 900° F. The best conversion of feedstock occurred at 1000° F with considerable loss in selectivity.

The addition of an iron metal promoter to the molybdenum/vanadium combination appears to activate the catalyst so that a larger conversion of butadiene occurs at a lower temperature (800°, 900°). Compare runs 36 and 40 with runs 3, 6, 9, 13, 21, 25, 27-29. With the unpromoted Mo/V catalyst the best Mo/V atom ratio occurs at 2/1 for reactor temperature of 900° or 800° F. When an iron metal promoter is added to the Mo/V combination the atom ratio of Mo/V of 4/1 appears to generally be more desirable based on conversion and furan yields. The primary effect of the promoter metals is to activate the basic Mo/V combination at the lower temperatures.

Reasonable variations and modifications are possible within the scope of the foregoing disclosure and the appended claims to the invention.

What is claimed is:

1. A process which comprises reacting at least one unsaturated acyclic feed hydrocarbon selected from the group consisting of alkenes and alkadienes having from 4 to 10 carbon atoms, with oxygen in contact with a catalyst consisting essentially of molybdenum, vanadium, oxygen, and at least one promoter selected from the group consisting of iron, cobalt, and nickel, under suitable vapor phase reaction conditions to convert said at least one unsaturated feed hydrocarbon to at least one furan compound having the formula

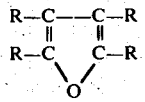

wherein each R is individually selected from the group consisting of hydrogen and alkyl radicals having from 1 to 6 carbon atoms, the total carbon atoms in the R radicals being in the range of 0 to 6; and recovering at least a portion of the furan compounds thus produced.

2. A process in accordance with claim 1 wherein said reaction conditions comprise a temperature in the range of about 500° F to about 1200° F, an unsaturated acyclic hydrocarbon feed rate in the range of about 10 to about 1000 GHSV, and an oxygen-to-feed unsaturated acyclic hydrocarbon mol ratio in the range of about 0.1:1 to about 3:1.

3. A process in accordance with claim 1 wherein the atom ratio of molybdenum to vanadium is in the range of about 10:1 to about 0.5:1, and the atom ratio of promoter to vanadium is in the range of about 2:1 to about 0.1:1.

4. A process in accordance with claim 1 wherein the atom ratio of molybdenum to vanadium is in the range of about 5:1 to about 1:1, and the atom ratio of promoter to vanadium is in the range of about 1:1 to about 0.3:1.

5. A process in accordance with claim 4 wherein said feed hydrocarbon comprises at least one acyclic alkadiene having from 4 to 5 carbon atoms.

6. A process in accordance with claim 5 wherein said feed hydrocarbon comprises butadiene.

7. A process in accordance with claim 6 wherein said promoter is cobalt.

8. A process in accordance with claim 6 wherein said promoter is iron.

9. A process in accordance with claim 6 wherein said promoter is nickel.

10. A process which comprises reacting under suitable reaction conditions at least one unsaturated acyclic feed hydrocarbon selected from the group consisting of alkenes and alkadienes having from 4 to 10 carbon atoms, with oxygen in contact with a catalyst consisting essentially of molybdenum, vanadium, oxygen, and at least one promoter selected from the group consisting of iron, cobalt, and nickel, to produce at least one furan compound having the formula

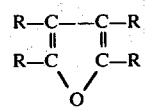

wherein each R is individually selected from the group consisting of hydrogen and alkyl radicals having from 1 to 6 carbon atoms, the total carbon atoms in the R radicals being in the range of 0 to 6; said reaction conditions comprising a temperature in the range of about 500°F to about 1200°F; and recovering at least a portion of the furan compounds thus produced.

11. A process in accordance with claim 10 wherein the atom ratio of molybdenum to vanadium is in the range of about 5:1 to about 1:1, and the atom ratio of promoter to vanadium is in the range of about 1:1 to about 0.3:1; and wherein said reaction conditions comprise a temperature in the range of about 700°F to about 1100°F, a pressure in the range of about 0.1 to about 25 psig, an unsaturated acyclic hydrocarbon feed rate in the range of about 100 to about 500 GHSV, and an oxygen-to-feed unsaturated acyclic hydrocarbon mol ratio in the range of about 0.5:1 to about 2:1.

12. A process in accordance with claim 11 wherein said feed hydrocarbon comprises at least one acyclic alkadiene having from 4 to 5 carbon atoms.

13. A process in accordance with claim 12 wherein said feed hydrocarbon comprises butadiene.

14. A process in accordance with claim 13 wherein said promoter is cobalt.

15. A process in accordance with claim 13 wherein said promoter is iron.

16. A process in accordance with claim 13 wherein said promoter is nickel.

* * * * *